Patented Sept. 19, 1933

UNITED STATES PATENT OFFICE 1,927,726

PROCESS OF PREPARING RADIOACTIVE SUBSTANCES

Kurt Weil, Bonn-on-the-Rhine, and Kurt Peters, Mulheim-Ruhr, Germany

No Drawing. Application December 17, 1930, Serial No. 503,098, and in Germany December 20, 1929

2 Claims. (Cl. 23—20)

The following process, by means of which a quantitative separation of radium from the other metals of the second perpendicular row of the Periodic system of elements can be carried out in one operation, is founded on the well-known fact, that the dissociation temperatures of the carbonates of these metals rise in accordance with their atomic weights. This is the case in the series Mg-Ca-Sr-Ba-Ra. The possibility of transforming the one carbonate into its oxide at relatively low temperatures, the carbonate of the following element being still undissociated, may be deducted from the course of the carbon dioxide tension curves; these showing in the same way as the vapor pressure curves an exponential rise of pressure with rising temperature. The temperatures at which the various carbonates have a noticeable carbon dioxide pressure, differ considerably from each other. Barium carbonate has, for instance, a measurable carbon dioxide pressure at a temperature, at which radium carbonate is still entirely undissociated.

It is very important in this process to work at a very low pressure whilst exhausting the carbon dioxide developed. For only under these conditions is it possible to dissociate the one carbonate at a temperature, at which the other carbonate, in this case radium carbonate, practically shows no carbon dioxide tension. The relation of the carbon dioxide tensions to each other is much more unfavorable for the separation at high temperatures and high pressures of carbon dioxide, than at low temperatures, as the well-known curves show. In this way, for instance we obtain a mixture of barium oxide and radium carbonate from a mixture of the two carbonates. Barium oxide can be separated by transforming it into its hydrate by treatment with water, radium carbonate being practically insoluble. This process can be employed most advantageously as a means of increasing radium and its isotopes, the barium surplus entirely removed. In this way very large quantities of inactive barium salts can be separated in one operation in form of the hydrate from the most minute quantities of radium carbonate. All the methods known at present yield poor radium fractions demanding a following fractional separation.

Example 1

100 mg. of a mixture of the carbonates of radium and barium containing 8.3 mg. of radium carbonate were heated in high vacuum at a temperature of 400° C. By measuring the quantity of the exhausted carbon dioxide the advance of the carbon dioxide dissociation could be controlled. After cooling the heated mixture, it was washed on a filter with hot water, until a drop of the filtrate gave no visible residue on a platinum-foil. The residue which was not soluble in water, was dissolved on the filter in hydrochloric or hydrobromic acid, the filtrate of the water extract by heating the carbonate mixture and dissolving it in water was acidified and evaporated. The radioactive measurement shows a quantitative yield of the radium salt. This was only possible to obtain by means of the known methods after continuously repeated recrystallization.

Example 2

5 g. of radium-barium-carbonate containing 18 mg. of the radium element were heated in high vacuum for several hours at a temperature of 800° C. After exhausting the calculated quantities of carbon dioxide, produced by the thermic dissociation of barium carbonate, the residue was extracted with water. The measurements of the gamma-rays, made in the course of the following four weeks, showed, that the water extract was perfectly free from radioactive substance, whereas the undissociated residue showed the whole activity.

Example 3

1 kg. of the radioactive materials of the thorium manufacture consisting of barium sulphate, containing besides the usual impurities ($CaSO_4$, $SiO_2$) a small quantity of mesothorium (and radium), was heated several hours to bright red-heat after having transformed the sulphates into carbonates; the carbon dioxide developed was continuously exhausted by an oil- or mercury vapor-pump. The cooled material was washed out with a quantity of hot water large enough to dissolve the produced barium oxide and then filtered. All the barium and calcium carbonate was separated in this way from the insoluble residue, containing all the mesothorium (and radium). The other impurities were then separated from the mesothorium in any usual way. After having transformed the material again into carbonates by any usual method, e. g. by precipitation or fusion with soda, the heating process was repeated.

This process can be employed for separating all radioactive substances forming carbonates, subject to thermic dissociation, especially the isotopes of radium: Ac X, MsTh I, Th X from similar elements.

What is claimed,

1. Method of concentrating radioactive substances in mixtures of mainly radium-barium carbonates consisting in a partial thermic dissociation and following separation by washing out the soluble substances yielded.

2. Method according to claim 1 consisting in a thermic dissociation at low pressures.

KURT WEIL.
KURT PETERS.